United States Patent
Pattan et al.

(10) Patent No.: US 10,178,611 B2
(45) Date of Patent: Jan. 8, 2019

(54) SCHEME FOR PERFORMING A DATA SESSION VIA A WI-FI ACCESS IN A WIRELESS COMMUNICATION SYSTEM

(71) Applicant: Samsung Electronics Co., Ltd., Suwon-si, Gyeonggi-do (KR)

(72) Inventors: Basavaraj Jayawant Pattan, Suwon-si (KR); Mangesh Abhimanyu Ingale, Yongin-si (KR); Ju-Ho Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 8 days.

(21) Appl. No.: 15/388,654

(22) Filed: Dec. 22, 2016

(65) Prior Publication Data
US 2017/0188298 A1 Jun. 29, 2017

(30) Foreign Application Priority Data
Dec. 23, 2015 (IN) .......................... 1331/KOL/2015

(51) Int. Cl.
*H04W 4/00* (2018.01)
*H04W 48/20* (2009.01)
(Continued)

(52) U.S. Cl.
CPC ....... *H04W 48/20* (2013.01); *H04M 1/72563* (2013.01); *H04W 4/02* (2013.01); *H04W 36/0022* (2013.01); *H04W 36/365* (2013.01); *H04W 48/16* (2013.01); *H04W 48/18* (2013.01); *H04W 76/11* (2018.02);
(Continued)

(58) Field of Classification Search
CPC combination set(s) only.
See application file for complete search history.

(56) References Cited

U.S. PATENT DOCUMENTS 8,437,810 B2   5/2013  Hussain
8,570,993 B2 * 10/2013  Austin .................... H04W 4/02
                                              370/338
(Continued)

FOREIGN PATENT DOCUMENTS

JP   10-089980 A    4/1998
JP   2014-233014 A  12/2014
(Continued)

OTHER PUBLICATIONS

European Office Action dated Nov. 30, 2018, issued in a counterpart European application No. 16879352.9-1216/3366066.

*Primary Examiner* — Frank Duong
(74) *Attorney, Agent, or Firm* — Jefferson IP Law, LLP (57) ABSTRACT

A method for performing a data session via a Wi-Fi access of a user equipment (UE) in a cellular network is provided. The method includes maintaining a look-up table including at least an entry, the entry including a Wi-Fi identifier of a Wi-Fi access point (AP) and location information of the Wi-Fi AP, determining whether a user preference for a Wi-Fi connection is set to ON or OFF, checking whether at least one matched entry of the look-up table is found based on current location information of the UE, scanning to discover the Wi-Fi AP, connecting to a Wi-Fi AP corresponding to the matched entry based on a result of the determining, and performing a data session via a Wi-Fi access to the connected Wi-Fi AP.

20 Claims, 6 Drawing Sheets

(51) Int. Cl.
| | |
|---|---|
| *H04W 76/11* | (2018.01) |
| *H04M 1/725* | (2006.01) |
| *H04W 4/02* | (2018.01) |
| *H04W 36/00* | (2009.01) |
| *H04W 36/36* | (2009.01) |
| *H04W 48/16* | (2009.01) |
| *H04W 48/18* | (2009.01) |
| *H04W 84/12* | (2009.01) |
| *H04W 88/08* | (2009.01) |
| *H04W 8/22* | (2009.01) |
| *H04W 36/14* | (2009.01) |
| *H04W 88/06* | (2009.01) |

(52) U.S. Cl.
CPC ...... *H04M 1/7253* (2013.01); *H04M 1/72572* (2013.01); *H04M 2250/06* (2013.01); *H04W 8/22* (2013.01); *H04W 36/14* (2013.01); *H04W 84/12* (2013.01); *H04W 88/06* (2013.01); *H04W 88/08* (2013.01)

(56) References Cited

U.S. PATENT DOCUMENTS

| | | | |
|---|---|---|---|
| 8,615,216 B2 * | 12/2013 | Rajguru | H04W 12/08 455/410 |
| 8,630,192 B2 * | 1/2014 | Raleigh | G06Q 10/06375 370/252 |
| 8,948,145 B2 * | 2/2015 | Kalbag | H04W 52/0261 370/338 |
| 9,826,464 B2 * | 11/2017 | Visuri | H04L 12/145 |
| 2012/0033594 A1 | 2/2012 | Kalbag | |
| 2014/0185604 A1 | 7/2014 | Kil et al. | |
| 2014/0293829 A1 | 10/2014 | Visuri et al. | |
| 2015/0024787 A1 | 1/2015 | Ben-Itzhak et al. | |
| 2015/0097731 A1 * | 4/2015 | Russell | G01S 19/48 342/450 |

FOREIGN PATENT DOCUMENTS

| | | |
|---|---|---|
| KR | 10-2012-0126859 A | 11/2012 |
| WO | 2011-022731 A1 | 2/2011 |

* cited by examiner

SCHEME FOR PERFORMING A DATA SESSION VIA A WI-FI ACCESS IN A WIRELESS COMMUNICATION SYSTEM

CROSS-REFERENCE TO RELATED APPLICATION(S)

This application claims the benefit under 35 U.S.C. § 119(a) of an Indian patent application filed on Dec. 23, 2015 in the Indian Patent Office and assigned Serial number 1331/KOL/2015, the entire disclosure of which is hereby incorporated by reference.

TECHNICAL FIELD

The present disclosure relates to a scheme for performing a data session via a Wi-Fi access in a wireless network. More particularly, the present disclosure relates to a method and system for switching from a cellular radio connection to a Wi-Fi connection, in a wireless communication system.

BACKGROUND

To meet the demand for wireless data traffic, which has increased since deployment of $4^{th}$-generation (4G) communication systems, efforts have been made to develop an improved $5^{th}$-generation (5G) or pre-5G communication system. Therefore, the 5G or pre-5G communication system is also called a 'beyond 4G network' or a 'post long term evolution (LTE) system'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, and large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation, and the like.

In the 5G system, hybrid frequency shift keying (FSK) and quadrature amplitude modulation (QAM) (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

There exist at least 2 solutions which are available today to connect to Wi-Fi radio access when preferred by a user.

In solution 1, a user needs to keep both Wi-Fi radio connection and mobile data connection (e.g., cellular radio connection) turned on all the time on the device. This means user preference settings on a device user interface (UI) for both Wi-Fi and mobile data is ON. When a device is in a Wi-Fi coverage of a known access point (AP), the device connects to the known AP as long as the device is in the Wi-Fi coverage area of the AP. When the device moves outside the Wi-Fi coverage area, a data session or internet access can happen through mobile data access on the cellular coverage provided by either a 4G or 3G network. Normally, the device connects to the known Wi-Fi AP when the device is in a good coverage area of Wi-Fi radio access. And when the Wi-Fi connection is completely lost, the device can automatically avail mobile data through cellular radio access without explicitly notifying the user. However, this solution results in heavy draining of battery (e.g., continuous scanning for new Wi-Fi APs) when connection to current Wi-Fi AP is lost.

In solution 2, a user needs to remember to manually switch on/off Wi-Fi user preference on the device at the right time. That is, the user needs to turn-on Wi-Fi radio connection on the device when the user enters the coverage of known Wi-Fi AP and turn-off Wi-Fi radio connection on the device when the user moves out of the coverage of connected Wi-Fi access to save battery drain. This solution has the following issues: a) lacks good user experience i.e., the user has to manually perform switch on/off every time, and b) the user may end up paying higher data charges for mobile data if the user forgets to utilize known Wi-Fi radio access where it was available.

User expectation is to use Wi-Fi radio capability on his/her device most of the time for data session and/or internet access when Wi-Fi radio access is available. Usage of mobile data (i.e., data session and/or internet access on a mobile device through cellular radio access technology like 4G LTE/worldwide interoperability for microwave access (WiMAX), 3G high speed packet access (HSPA)/universal mobile telecommunications system (UMTS) etc.) on his/her device through cellular radio access is preferred when Wi-Fi radio access is not available to him/her. In overlapping coverage scenarios, Wi-Fi radio access is usually preferred over mobile data (i.e. cellular radio access through 4G or 3G) because Wi-Fi is supposed to provide faster access and high data rates at a lower cost compared to similar data rates through the cellular radio access.

To achieve the above mentioned user expectation, existing solutions either incur significant battery power drain or are not elegant from user experience perspective or both.

The above information is presented as background information only to assist with an understanding of the present disclosure. No determination has been made, and no assertion is made, as to whether any of the above might be applicable as prior art with regard to the present disclosure.

SUMMARY

A new apparatus and method are required for user expectation to use Wi-Fi radio access preferably with improved user experience and incurring less battery power consumption.

In embodiments of the present disclosure, a simple and elegant solution is proposed so that a user does not have to manually perform switching of Wi-Fi user preference settings on his/her device. Various of the proposed embodiments allow a device to automatically switch on/off Wi-Fi radio capability based on determining a time to switch. The proposed embodiments may be termed as "smart Wi-Fi switch (SWS)" in the present disclosure.

Aspects of the present disclosure are to address at least the above-mentioned problems and/or disadvantages and to provide at least the advantages described below. Accordingly, an aspect of the present disclosure is to provide a method and system for using location information intelligently for determining a time to automatically switch on/off a Wi-Fi radio capability based on a look-up table.

Another aspect of the present disclosure is to provide a system and method for creating a new entry in a reference table or a look-up table with the available location information for a plurality of granularities corresponding to a Wi-Fi identifier.

Another aspect of the present disclosure is to provide a system and method for automatically switching on/off a Wi-Fi radio capability when the user preference for Wi-Fi on the device is turned ON.

Another aspect of the present disclosure is to provide a system and method for automatically switching on/off a Wi-Fi radio capability when the user preference for Wi-Fi on the device is turned OFF.

Another aspect of the present disclosure is to provide a system and method for finding a location matched in the reference table or look-up table based on a current location of the device to determine the presence of any known Wi-Fi access point (AP).

Another aspect of the present disclosure is to provide a system and method for finding a location matched in the reference table or look-up table based on a current location of the device to determine the presence of an open Wi-Fi AP.

Another aspect of the present disclosure is to provide a system and method for activating a scan timer to periodically scan and discover a Wi-Fi AP after a location match is found in the reference table or look-up based on a current location of the device.

Another aspect of the present disclosure is to provide a system and method for stopping and resetting a scan timer when the device connects to a discovered Wi-Fi AP after a location match is found in the reference table or look-up based on a current location of the device.

Another aspect of the present disclosure is to provide a system and method for activating a prompt timer to avoid scanning for additional Wi-Fi APs wherein the user has declined consent to connect to the discovered Wi-Fi AP after a location match was found.

In accordance with an aspect of the present disclosure, a method for performing a data session via a Wi-Fi access of a user equipment (UE) in a cellular network is provided. The method includes maintaining a look-up table including at least an entry, the entry including a Wi-Fi identifier of a Wi-Fi AP and location information of the Wi-Fi AP, determining whether a user preference for a Wi-Fi connection is set to ON or OFF, checking whether at least one matched entry of the look-up table is found based on current location information of the UE, scanning to discover the Wi-Fi AP, connecting to a Wi-Fi AP corresponding to the matched entry based on a result of the determining, and performing a data session via a Wi-Fi access to the connected Wi-Fi AP.

In accordance with another aspect of the present disclosure, a UE for performing a data session via a Wi-Fi access in a cellular network is provided. The UE includes at least one processor configured to maintain a look-up table including at least an entry, the entry including a Wi-Fi identifier of a Wi-Fi AP and location information of the Wi-Fi AP, determine whether a user preference for a Wi-Fi connection is set to ON or OFF, check, based on current location information of the UE, whether at least one matched entry of the look-up table are found, scan to discover the Wi-Fi AP, and connect to a Wi-Fi AP corresponding to the matched entry based on a result of the determining, and a transceiver configured to perform a data session via a Wi-Fi access to the connected Wi-Fi AP.

The present disclosure offers various benefits regarding a better user experience with SWS (in comparison to manually remembering to switch between Wi-Fi and mobile data).

In embodiments of the present disclosure, it is assumed that Wi-Fi speed is better and optimum usage of Wi-Fi is provided.

In embodiments of the present disclosure, battery usage is reduced because Wi-Fi is not always on and the battery does not drain due to continuous scanning in non-Wi-Fi areas.

In embodiments of the present disclosure, there is a reduction in mobile data charges in Wi-Fi available areas.

From a mobile operator's point of view it is also preferred that some services are offloaded to Wi-Fi radio access so the load on the cellular radio network can be balanced.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein may be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy, limitations and other factors known to those of skill in the art, may occur in amounts that do not preclude the effect the characteristic was intended to provide.

Before a description of the present disclosure is made, examples of interpretable meanings will be provided for several terms used herein. However, it should be noted that the meanings of the terms are not limited to the examples provided below.

A base station (BS) is an entity that communicates with a user equipment (UE), and may also be referred to as a BS, a nodeB (NB), an evolved NB (eNB), an access point (AP), or the like. However, in the present disclosure, a Wi-Fi AP may be distinguished from an eNB for cellular radio connection, in respect to access schemes.

The UE is an entity that communicates with the BS, and may also be referred to as a user/device, a mobile station (MS), a mobile equipment (ME), a terminal, or the like.

Figure 1:
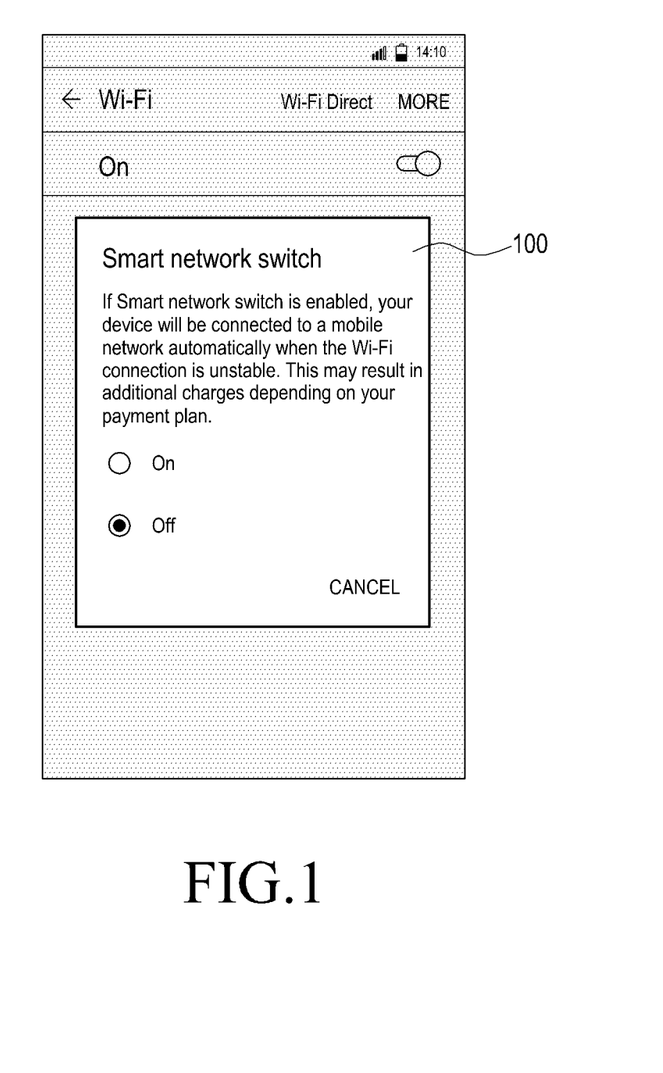
FIG. 1 illustrates a smart network switch feature according to an embodiment of the present disclosure.

FIG. 1 illustrates a smart network switch feature according to an embodiment of the present disclosure.

Referring to FIG. 1, a solution called smart network switch (SNS), mobile data connection (e.g., cellular radio connection) is always turned ON, while a Wi-Fi access is switched continuously keeping the Wi-Fi radio capability in the device always ON. The SNS may be implemented on latest mobile devices such a smartphones, tablets, notebooks etc. From a user interface's point of view, the user is prompted with an appropriate message 100 on the device to enable or disable the SNS feature as shown in FIG. 1.

If the user desires to enable the SNS feature, then the user is aware of the consequences of enabling the SNS feature. The pre-condition for enabling the SNS feature is that the mobile data user preference setting on the device should always be turned ON. The SNS is specifically designed to switch from cellular radio access to Wi-Fi radio access (if Wi-Fi radio capability is turned on through user preference) when good quality Wi-Fi signal strength is available. Similarly, a switch from an already connected Wi-Fi radio access to cellular radio access (i.e. mobile data access) occurs if the Wi-Fi connection is degrading and causing problems due to a poor coverage. The SNS will keep track of dealing with a spotty or degrading Wi-Fi connection by making the switch automatically, leaving a user a notification explaining an unstable Wi-Fi connection was discovered so access is switched to mobile data access automatically.

Switching from a Wi-Fi access to a mobile data access does not turn off a Wi-Fi radio capability in the device. Further, the device performs continuous switching from the Wi-Fi access to the mobile data access back and forth in certain time intervals (time intervals are implementation specific) during which Wi-Fi scanning for new access points will continue in the background, which leads to battery drain. Due to continuous switching for the radio access at the protocol lower layer, the device internet protocol (IP) address is not preserved when switching happens. This may lead to service discontinuity or (more precisely) session discontinuity if mechanisms for service/session continuity are not implemented at the application layer upon a change of IP address handling the ongoing session. Further, continuous notification to the user is not desired from a user experience perspective. Even though this solution automatically handles the switching for radio access, it does not provide a desired user experience and also suffers from battery drain due to continuous scanning for switching functionality.

From a mobile network operator's (MNO's) point of view it is also preferred that some services are offloaded to Wi-Fi radio access so a load on the mobile network can be balanced. However, the operator's interest to offload data sessions to Wi-Fi radio access is not handled efficiently.

Therefore, there is a need to have a new solution to meet user expectation to use Wi-Fi radio access preferably with an improved user experience and less battery power consumption.

In embodiments of the present disclosure, a smart Wi-Fi switch (SWS) solution is proposed. The proposed SWS solution works based on at least one of following principles:

a) A cellular coverage such a $4^{th}$ generation (4G), $3^{rd}$ generation (3G) or any other cellular radio access technology providing packet switched services is overlaid with a Wi-Fi coverage, and cellular radio capability in a device is always ON for mobile data (i.e. user preference for mobile data is ON).

b) A look-up table, reference table or database is dynamically maintained having a plurality of Wi-Fi identifiers tagged with location information.

c) The device identifies (determines) its current location information and checks the look-up table, database, or reference table for a match.

d) User preference may keep a Wi-Fi radio capability in the device turned ON or turned OFF.

Figure 2:
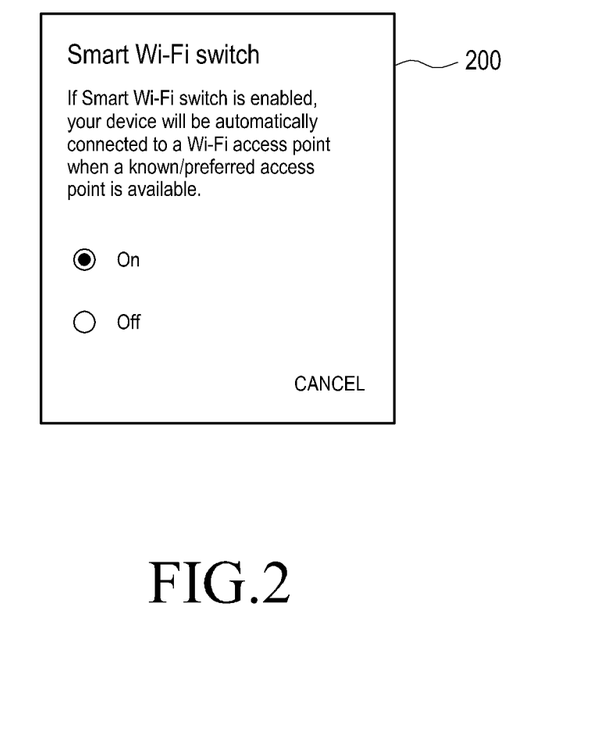
FIG. 2 illustrates enabling a smart Wi-Fi switch (SWS) according to an embodiment of the present disclosure.

FIG. 2 illustrates enabling a smart Wi-Fi switch according to an embodiment of the present disclosure.

Referring to FIG. 2, a user is prompted with an appropriate message 200 on a device to enable or disable an SWS feature.

Figure 3A:
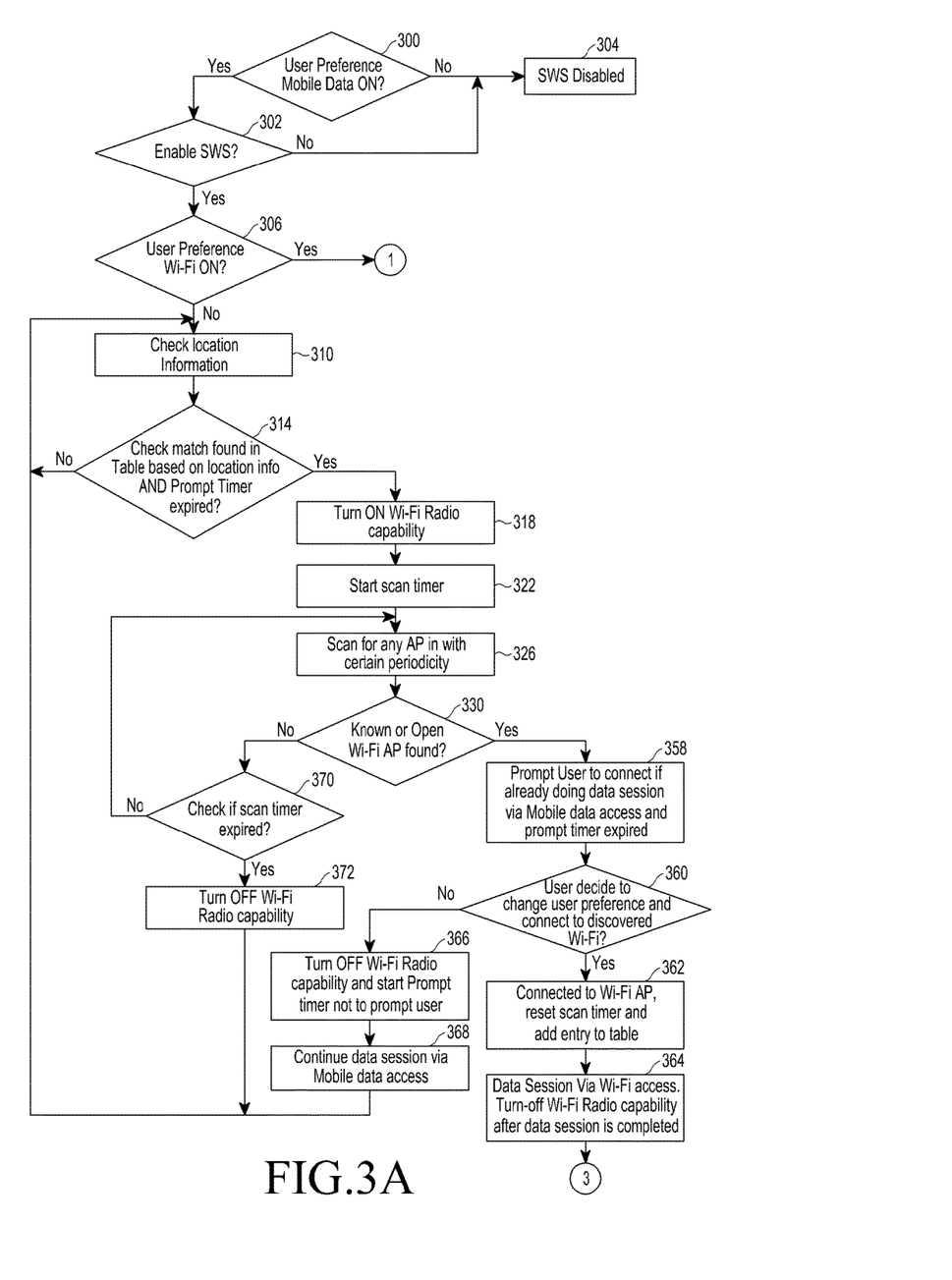
FIGS. 3A and 3B illustrate a process of an SWS feature according to various embodiments of the present disclosure.
Figure 3B:
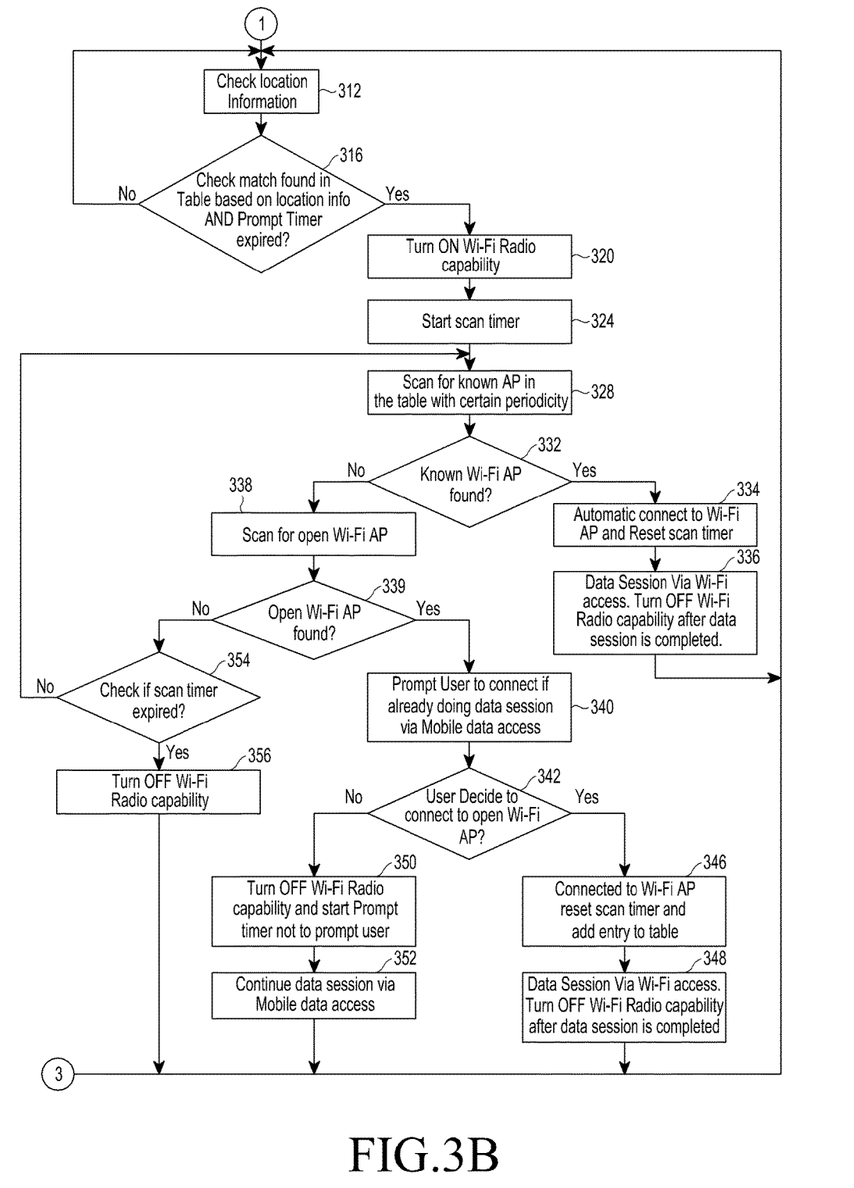

FIGS. 3A and 3B illustrate a process of an SWS feature according to various embodiments of the present disclosure.

Referring to FIGS. 3A and 3B, the device may determine whether mobile data is set to ON by a user preference at operation 300. An SWS feature can be enabled at operation 302 when the mobile data is ON in the device according to the user preference, else the SWS feature is disabled at operation 304.

The SWS feature may be enabled by the user regardless of a user preference setting for Wi-Fi connection in the device. This means that working of the SWS feature can be independent of the user preference setting for Wi-Fi on the device. Therefore, FIGS. 3A and 3B depict the working of the SWS feature when Wi-Fi connection is ON and when Wi-Fi connection is OFF according to the user preference setting.

The SWS feature works on the principle of determining the user/device location and the principle of checking the look-up table, database, or reference table for known Wi-Fi APs or open Wi-Fi APs.

For determining the user/device location, any available mechanism in the device can be used. Since a device has a cellular radio capability, location information is available to the user/device on a cell-ID granularity (i.e., precision of location information is based on cell coverage area covered by the cell-ID) and/or a public land mobile network-ID (PLMN-ID) granularity based on a current serving base-station for cellular access. If the device is equipped with a positioning radio capability like a global positioning system (GPS), a global navigation satellite system (GNSS), etc., and if such capability is enabled then the location information is available on a granularity provided by the positioning radio capability. The location information is not restricted to above mechanism but could be based on any positioning mechanism available in the device such as an indoor positioning mechanism.

Figure 4:
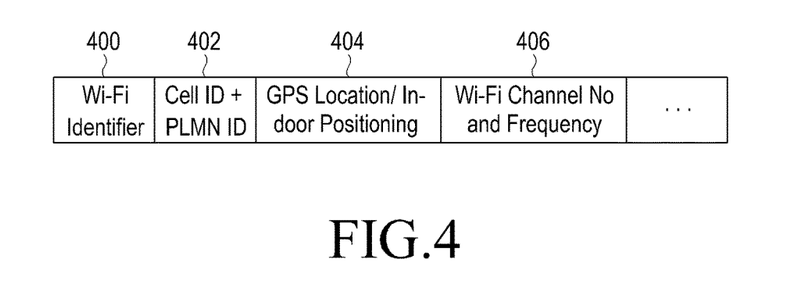
FIG. 4 illustrates an information structure for a Wi-Fi access point (AP) binding with cell identification (ID) and public land mobile network ID (PLMN ID) according to an embodiment of the present disclosure.

FIG. 4 illustrates an information structure for a Wi-Fi AP binding with cell-ID and PLMN-ID according to an embodiment of the present disclosure.

Referring to FIG. 4, in a reference table or a look-up table, a new entry may be created as follows.

When a device is connected to any new Wi-Fi AP based on user consent or a user preference, a new entry is created in a reference table or look-up table. The entry in the table includes a Wi-Fi identifier 400 such as a service set identifier (SSID), a basic SSID (BSSID) (which is basically a media access control (MAC) address of the Wi-Fi AP) or some other identifier tagged with at least the location information 402 or 404 as depicted in FIG. 4. The Wi-Fi AP identifier can also be a combination of SSID and BSSID, or the Wi-Fi AP identifier can be some other identifier.

Other information such as frequency channel number 406 on which the Wi-Fi AP is operating can also be tagged to the Wi-Fi identifier 400 in the look-up table. The location information 402, 404 that can be included along with the Wi-Fi identifier is based on the granularity of location information available at that position. For an SWS operation, the mobile data is always ON. This means that cellular radio capability is always enabled. Thus, at least current cell-ID and/or PLMN-ID 402 of a cellular network serving the device may be included along with the Wi-Fi identifier 400, and optionally the operating frequency channel 406 of that Wi-Fi AP to which the device is connected after user consent may be included along with the Wi-Fi identifier 400.

Further, location information 404 of a finer granularity can be used if available, such as GPS co-ordinates and/or location information based on an in-door positioning mechanism. As shown in FIG. 4, a Wi-Fi identifier 400 (e.g., SSID/BSSID) is marked in the reference table or look-up table for the operation of SWS feature, and such table is transparent to a user.

If the SWS feature is enabled in operation 302 and the user preference for Wi-Fi connection is set to ON in operation 306, then the device will check the location information at operation 312 either based on cell-ID and/or PLMN-ID and/or GPS co-ordinates if available. The location information is used to check to find a match in the reference table or look-up table to determine the presence of any known Wi-Fi AP in the current location at operation 316.

If a match for a current location is found in the reference table or look-up table, then the Wi-Fi radio capability (or Wi-Fi radio module) is turned ON at operation 320, and a timer called "Scan Timer" is started at operation 324. The Wi-Fi radio module in the device is not turned ON if a timer called "Prompt Timer" is running. When the SWS feature is enabled for the first time, the "Prompt Timer" is OFF.

The Wi-Fi radio module performs a scanning operation to discover the known Wi-Fi AP from the look-up table at operation 328. A timer called "Scan Timer" is started during which the Wi-Fi radio module in the device will periodically scan to discover the Wi-Fi AP. To save battery power, scanning periodicity to discover the Wi-Fi AP can be adjusted based on the granularity of the location information. For example, if the location information has coarse granularity such as cell-ID and/or PLMN-ID then corresponding scanning periodicity is longer than a scanning periodicity of the location information which has finer granularity such as GPS co-ordinates. Such adjustment of the scanning periodicity based on the granularity of the location information is useful to trade-off the battery consumption against the probability of discovering the Wi-Fi AP. During the scanning at operation 328, the Wi-Fi radio module in the device may prioritize the discovery for the known Wi-Fi AP in the reference table.

In the event a known Wi-Fi AP from the reference table or look-up table is discovered at operation 332, the device will automatically connect to the known Wi-Fi AP and the scan timer is stopped and reset at operation 334. Now a data session continues through a Wi-Fi access to the known Wi-Fi AP even when the mobile data is ON as long the device remains connected to the known Wi-Fi AP at operation 336. If the user moves outside the coverage of a Wi-Fi AP, then the data session continues through the mobile data through the cellular radio access. The Wi-Fi radio capability is turned OFF if the data session is complete or when the user moves outside the coverage of the known Wi-Fi AP.

In the event a known Wi-Fi AP from the reference table or look-up table is not discovered, then the device scans for open Wi-Fi APs at operation 338. If the device discovers an open Wi-Fi AP at operation 339, then the user is prompted for user consent to connect to the discovered open Wi-Fi AP at operation 340. The prompting for the user consent may happen if it is determined that user is currently performing a data session.

Assuming such a situation after prompting the user, in operation 342 the user may decide to connect to the open Wi-Fi AP or decide to continue a data session using the mobile data through the cellular radio access if he/she is not interested.

If the user decides to connect to the discovered open Wi-Fi, then the device will connect to the open Wi-Fi AP and the scan timer is stopped and reset at operation 346. An entry for a Wi-Fi identifier for the discovered open Wi-Fi is created in the look-up table or reference table along with available location information. Now the data session continues through a Wi-Fi access to the open Wi-Fi AP even when the mobile data is ON as long as the device remains connected to the open Wi-Fi AP at operation 348. If the user moves outside the coverage of the open Wi-Fi AP, then the data session continues using the mobile data through the cellular radio access. The Wi-Fi radio capability is turned OFF if the data session is complete or when the user moves outside the coverage of the open Wi-Fi AP.

If the user decides to continue with the data session using the mobile data through the cellular radio access by declining the prompt at operation 340 to connect to the discovered open Wi-Fi AP, then the Wi-Fi radio capability is turned OFF and a timer called as "Prompt Timer" is started at operation 350. As long as the "prompt timer" is running, the Wi-Fi radio capability cannot be turned ON. Such mechanism avoids an annoyance to the user with continuous prompting to connect to the discovered open APs for which he/she had declined some time ago. Now the device continues the data session via the mobile data access at operation 352.

In the event neither a known Wi-Fi AP from the look-up table nor an open Wi-Fi AP is discovered, then the periodic scanning continues as long as the scan timer is running. The device will check if the scan timer has expired or not at operation 354. If the scan timer expires then the Wi-Fi radio capability is turned OFF at operation 356 till the time a match for a newly determined location information is found in the look-up table or reference table.

If the SWS feature is enabled and the user preference for Wi-Fi connection is set to OFF, checking at operation 310 for location information and checking at operation 314 for a match in the look-up table will happen (even if a Wi-Fi radio capability is OFF from a user preference's point of view). All the operations described above for the case where a user interface shows Wi-Fi radio capability ON from the user preference's point of view, are applicable when the user interface shows Wi-Fi radio capability OFF from the user preference's point of view. Even if the user interface shows Wi-Fi OFF, the SWS feature may turn ON the Wi-Fi radio capability (i.e., Wi-Fi radio module) in the device when a match is found at operation 318.

A timer called "Scan Timer" is started at operation 322. The Wi-Fi radio module in the device is not turned ON if a timer called "Prompt Timer" is running. When the SWS feature is enabled for the first time, the "Prompt Timer" is OFF.

The Wi-Fi radio module performs a scanning operation to discover any Wi-Fi AP in a certain periodicity at operation 326. The timer called "Scan Timer" is started during which the Wi-Fi radio module in the device will periodically scan to discover the Wi-Fi AP. To save battery power, scanning periodicity to discover the Wi-Fi AP can be adjusted based on the granularity of the location information.

In the event a known Wi-Fi AP from the reference table or look-up table or an open Wi-Fi AP is discovered at operation 330, the user is prompted about the availability of Wi-Fi AP at operation 358. Then the user consent is mainly either to change the user preference for Wi-Fi access or to connect to the discovered Wi-Fi AP without changing the user preference (i.e., the user interface on the device will still show Wi-Fi OFF even when the user has given consent to connect to Wi-Fi access).

In the event the user has given consent and decides to connect to the discovered Wi-Fi AP at operation 360 (from a user interface on the device, Wi-Fi may show ON or OFF), the scan timer is reset and an entry for the Wi-Fi identifier is created in the look-up table or reference table along with available location information at operation 362. Now, a data session continues through a Wi-Fi access to the known or open Wi-Fi AP at operation 364. The Wi-Fi radio capability is turned OFF after the data session is complete or when the user moves outside the coverage of the Wi-Fi AP.

In the event the user decides to continue with a data session using mobile data through a cellular radio access by declining the prompt to either change the user preference or to connect to the discovered known/open Wi-Fi AP at operation 360, the Wi-Fi radio capability is turned OFF and a timer called "Prompt Timer" is started at operation 366. As long as the prompt timer is running, the Wi-Fi radio module in the device will not be turned ON even if a new location match is found in the look-up table. The user will not be prompted to change the user preference when the prompt timer is running because the Wi-Fi radio module in the device is turned OFF. Now, the device continues the data session via the mobile data access at operation 368.

In the event no known or open Wi-Fi AP is found at operation 330, the device will check if the scan timer has expired or not at operation 370. If the scan timer has expired, the device will turn the Wi-Fi radio capability off at operation 372.

It can be observed from FIGS. 3A and 3B that the working of the SWS feature is to a large extent independent of the setting of user preference for Wi-Fi (i.e., whether the user interface on the device shows Wi-Fi ON or OFF does not matter if the SWS feature is enabled). One side benefit of the SWS feature is that the SWS feature simplifies the user interface and settings for user preference. For example, if the mobile data is ON according to the user preference, then the user has the option to enable the SWS feature. If the SWS feature is enabled, then one option on the user interface is to disable the Wi-Fi user preference because the SWS operation is independent of that. If the SWS feature is disabled, then user can set a preference for Wi-Fi ON/OFF through user preference settings.

Figure 5:
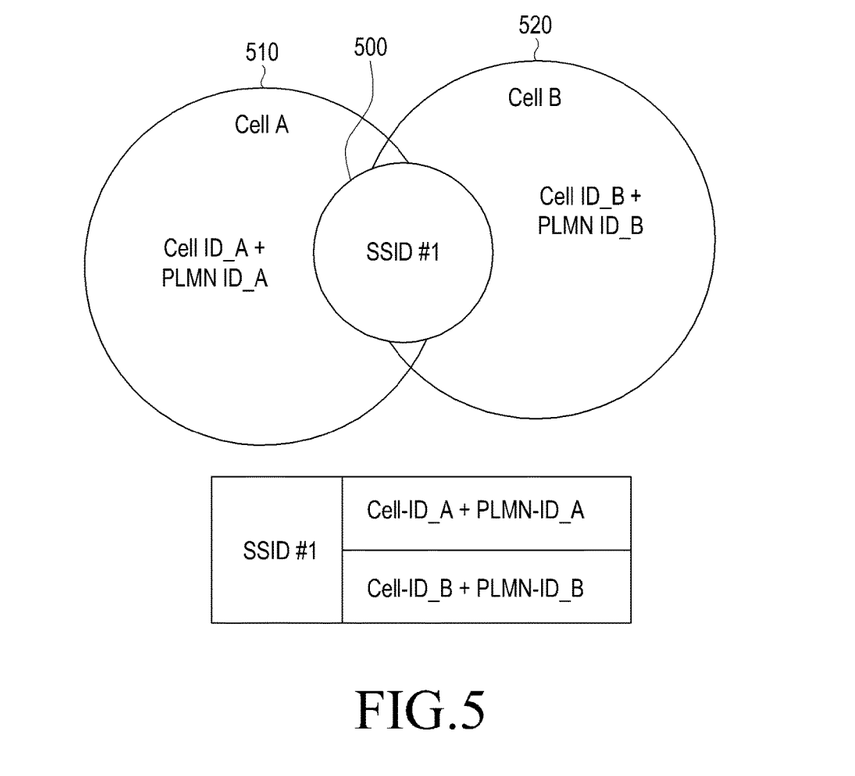
FIG. 5 illustrates a situation of overlapping cell coverage areas in a cellular network according to an embodiment of the present disclosure.

FIG. 5 illustrates a situation of overlapping cell coverage areas in a cellular network according to an embodiment of the present disclosure.

Referring to FIG. 5, since a cell-ID and a PLMN-ID will be used as baseline location information to develop a look-up table or reference table, there is a situation of overlapping cell coverage areas in a cellular network. To cover such cases, i.e., a Wi-Fi AP 500 (denoted by SSID #1) is deployed on overlapping coverage of multiple cells (i.e., Cell A 510 and Cell B 520). In such situation the cell-ID and PLMN-ID for both overlapping cells are stored corresponding to a Wi-Fi AP identifier of the Wi-Fi AP in the look-up table. For example, cell-ID_A+PLMN-ID_A for cell A 510 and cell-ID_B+PLMN-ID_B for cell B 520 may be stored to the Wi-Fi AP identifier of the Wi-Fi AP 500.

Figure 6:
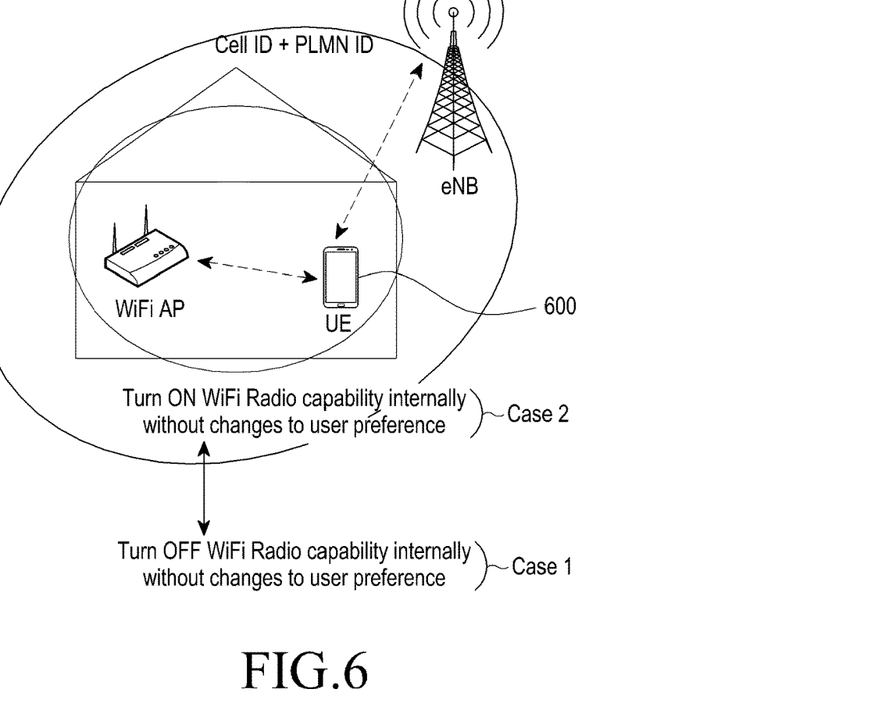
FIG. 6 illustrates a Wi-Fi radio capability behavior when a user/device is moving to a new location when SWS is enabled according to an embodiment of the present disclosure.

FIG. 6 illustrates a Wi-Fi radio capability behavior when a user/device is moving to a new location when SWS is enabled according to an embodiment of the present disclosure.

Referring to FIG. 6, in Case 1, the user/device 600 moves from a match found in a look-up table location to a no match found location. In this case, the Wi-Fi radio capability in the device is turned OFF internally without changes to a user interface (i.e., no changes to user preference related to Wi-Fi).

In Case 2, the user/device moves from a no match found in a look-up table location to a match found location. In this case, the Wi-Fi radio capability in the device is turned ON internally without changes to user interface, and the device scans for a Wi-Fi access point with a certain periodicity; if user interaction is detected regardless of the user preference related to Wi-Fi on the device user interface.

In Case 3, the user/device moves from a match found in a look-up table location to another match found location. In this case, the Wi-Fi radio capability remains turned ON internally and only scans for stored access points according to the look up table on any priority.

Figure 7:
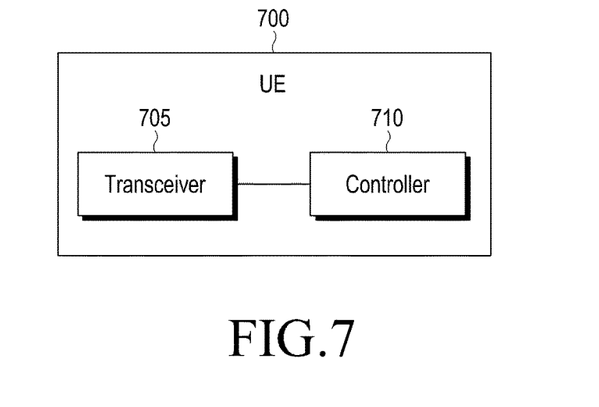
FIG. 7 is a view schematically illustrating a configuration of a user equipment (UE) device according to an embodiment of the present disclosure.

FIG. 7 is a view schematically illustrating a configuration of a UE device according to an embodiment of the present disclosure.

Referring to FIG. 7, the UE 700 may include a transceiver 705 communicating signals with another communication device or an entity in a network, and a controller (e.g., one or more processors) 710 controlling operations performed by the UE 700. It may be appreciated that all of the operations of the UE described above in connection with various cases of the present disclosure are performed under the control of the controller 710. Further, the controller 710 and the transceiver 705 are not necessarily implemented as separate devices, but may be implemented in a single configuration unit in the form of, e.g., a single chip.

It should be noted that signal flows, system configurations, and examples of control methods as shown in FIGS. 1, 2, 3A, 3B, 4, 5, 6, and 7 are not intended as limiting the scope of the present disclosure. In other words, all the components or operational operations illustrated in FIGS. 1, 2, 3A, 3B, 4, 5, 6, and 7 should not be construed as essential components to practice the present disclosure, and the present disclosure may be implemented with only some of the components without departing from the gist of the present disclosure.

The above-described operations may be realized by equipping a memory device retaining their corresponding codes in an entity, or any component of a UE device in a communication system. That is, the controller in the entity, or the UE device may execute the above-described operations by reading and executing the program codes stored in the memory device by a processor or central processing unit (CPU).

As described herein, various components or modules in the entity or UE device may be operated using a hardware circuit, e.g., a complementary metal oxide semiconductor-based logic circuit, firmware, software, and/or using a hardware circuit such as a combination of hardware, firmware, and/or software embedded in a machine-readable medium. As an example, various electric structures and methods may be executed using electric circuits such as transistors, logic gates, or application specific integrated circuits (ASICs).

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for establishing a data session via a Wi-Fi access of a user equipment (UE) in a cellular network, the method comprising:
   maintaining a look-up table including at least an entry, the entry including a Wi-Fi identifier of a Wi-Fi access point (AP) and location information of the Wi-Fi AP;
   checking whether at least one matched entry of the look-up table is found based on current location information of the UE;
   turning on a Wi-Fi radio capability automatically and scanning to discover the Wi-Fi AP if the at least one matched entry of the look-up table is found;
   connecting to the Wi-Fi AP corresponding to the matched entry based on whether a user preference for a Wi-Fi connection is set to ON or OFF; and
   establishing a data session via a Wi-Fi access to the connected Wi-Fi AP.

2. The method of claim 1, wherein, if the user preference for the Wi-Fi connection is set to OFF, the connecting to the Wi-Fi AP corresponding to the matched entry comprises:
   displaying a message requesting consent to connect to the Wi-Fi AP corresponding to the matched entry; and
   connecting to the Wi-Fi AP corresponding to the matched entry if the consent to connect to the Wi-Fi AP is input in response to the message.

3. The method of claim 2, further comprising:
   starting a timer if the consent to connect to the Wi-Fi AP is not input in response to the message; and
   repeating the checking of whether the at least one matched entry of the look-up table is found based on the current location information of the UE if the timer has expired.

4. The method of claim 2, further comprising:
   adding a new entry with respect to the connected Wi-Fi AP to the look-up table.

5. The method of claim 1, wherein, if the user preference for the Wi-Fi connection is set to ON, the connecting to the Wi-Fi AP corresponding to the matched entry comprises:
   connecting automatically to the Wi-Fi AP corresponding to the matched entry if the Wi-Fi AP is a known Wi-Fi AP.

6. The method of claim 1, wherein, if the user preference for the Wi-Fi connection is set to ON, the connecting to the Wi-Fi AP corresponding to the matched entry comprises:
   displaying a message requesting consent to connect to the Wi-Fi AP corresponding to the matched entry if the Wi-Fi AP is not known to the UE but is an open Wi-Fi AP; and
   connecting to the Wi-Fi AP corresponding to the matched entry if the consent to connect to the Wi-Fi AP is input.

7. The method of claim 6, further comprising:
   starting a timer if the consent to connect to the Wi-Fi AP is not input in response to the message; and
   repeating the checking of whether the at least one matched entry of the look-up table is found based on the current location information of the UE if the timer has expired.

8. The method of claim 1, further comprising:
   starting a timer; and
   repeating the scanning to discover the Wi-Fi AP a plurality of times if the timer has not expired.

9. The method of claim 1, wherein the data session has been established via a cellular radio access before the UE is connected to the Wi-Fi AP.

10. The method of claim 1, further comprising:
    turning ON the Wi-Fi radio capability of the UE, before the scanning, regardless of a setting of the user preference for the Wi-Fi connection.

11. A user equipment (UE) for establishing a data session via a Wi-Fi access in a cellular network, the UE comprising:
    a transceiver; and
    at least one processor configured to:
       maintain a look-up table including at least an entry, the entry including a Wi-Fi identifier of a Wi-Fi access point (AP) and location information of the Wi-Fi AP,
       check whether at least one matched entry of the look-up table is found based on current location information of the UE,
       turn on a Wi-Fi radio capability automatically and scan to discover the Wi-Fi AP if the at least one matched entry of the look-up table is found,
       connect to the Wi-Fi AP corresponding to the matched entry based on whether a user preference for a Wi-Fi connection is set to ON or OFF, and
       establish a data session via a Wi-Fi access to the connected Wi-Fi AP.

12. The UE of claim 11, wherein, if the user preference for the Wi-Fi connection is set to OFF, the at least one processor is further configured to:
    display a message requesting consent to connect to the Wi-Fi AP corresponding to the matched entry, and
    connect to the Wi-Fi AP corresponding to the matched entry if the consent to connect to the Wi-Fi AP is input in response to the message.

13. The UE of claim 12, wherein the at least one processor is further configured to:
    start a timer if the consent to connect to the Wi-Fi AP is not input in response to the message, and
    repeat the checking of whether the at least one matched entry of the look-up table is found based on the current location information of the UE if the timer has expired.

14. The UE of claim 12, wherein the at least one processor is further configured to add a new entry with respect to the connected Wi-Fi AP to the look-up table.

15. The UE of claim 11, wherein, if the user preference for the Wi-Fi connection is set to ON, the at least one processor is further configured to connect automatically to the Wi-Fi AP corresponding to the matched entry if the Wi-Fi AP is a known Wi-Fi AP.

16. The UE of claim 11, wherein, if the user preference for the Wi-Fi connection is set to ON, the at least one processor is further configured to:
   display a message requesting consent to connect to the Wi-Fi AP corresponding to the matched entry if the Wi-Fi AP is not known to the UE but is an open Wi-Fi AP, and
   connect to the Wi-Fi AP corresponding to the matched entry if the consent to connect to the Wi-Fi AP is input.

17. The UE of claim 16, wherein the at least one processor is further configured to:
   start a timer if the consent to connect to the Wi-Fi AP is not input in response to the message, and
   repeat the checking of whether the at least one matched entry of the look-up table is found based on the current location information of the UE if the timer has expired.

18. The UE of claim 11, wherein the at least one processor is further configured to:
   start a timer, and
   repeat the scanning to discover the Wi-Fi AP a plurality of times if the timer has not expired.

19. The UE of claim 11, wherein the data session has been established via a cellular radio access before the UE is connected to the Wi-Fi AP.

20. The UE of claim 11, wherein the at least one processor is further configured to turn ON the Wi-Fi radio capability of the UE regardless of a setting of the user preference for the Wi-Fi connection.

* * * * *